United States Patent [19]

Daniel et al.

[11] Patent Number: 4,573,353

[45] Date of Patent: Mar. 4, 1986

[54] METHOD AND APPARATUS FOR OBTAINING A NOZZLE VELOCITY PROFILE OF A TENTER OVEN

[75] Inventors: Vernon T. Daniel, Oak Ridge; James R. Johnson; Edward J. Robbins, both of Greensboro, all of N.C.

[73] Assignee: Burlington Industries, Inc., Geeensboro, N.C.

[21] Appl. No.: 492,219

[22] Filed: May 6, 1983

[51] Int. Cl.[4] .............................................. G01F 13/00
[52] U.S. Cl. ........................................ 73/198; 34/34; 34/54; 34/158; 26/92
[58] Field of Search ...................... 73/159, 198, 861.66, 73/861.67; 34/34, 54, 158; 26/92

[56] References Cited

U.S. PATENT DOCUMENTS

| | | | |
|---|---|---|---|
| 1,087,988 | 2/1914 | Sheldon | 73/861.66 |
| 1,620,633 | 3/1927 | Colvin | 73/861.67 |
| 2,099,160 | 11/1937 | Charch | 34/34 |
| 2,773,312 | 12/1956 | Peck | 26/92 |
| 3,129,072 | 4/1964 | Cook et al. | 34/54 |
| 3,780,578 | 12/1973 | Sellman et al. | 73/227 |
| 3,961,425 | 6/1976 | Swanson et al. | 26/92 |
| 4,087,568 | 5/1978 | Fay | 34/54 |
| 4,360,277 | 11/1982 | Daniel et al. | 374/137 |
| 4,365,425 | 12/1982 | Gotchel | 34/54 |
| 4,395,232 | 7/1983 | Koch | 73/861.66 |

FOREIGN PATENT DOCUMENTS 638397 10/1936 Fed. Rep. of Germany .
867675 5/1961 United Kingdom .

Primary Examiner—David L. Lacey
Attorney, Agent, or Firm—Cushman, Darby & Cushman

[57] ABSTRACT

The nozzle velocity profile of a textile treating assembly, such as a tenter oven, is determined in a simple and effective manner. A pitot tube is mounted on a fabric web-engaging support. A pressure transducer is operatively connected to the pitot tube and produces an electrical signal proportional to the difference between the static and total pressures sensed by the pitot tube for each nozzle. A wire is releasably connected to the transducer and extends to the exterior of the tenter oven, and is connected to a reeling assembly at the exterior of the tenter oven. The position of the sensing portion of the pitot tube is adjustable so that it can extend above or below the fabric web.

20 Claims, 4 Drawing Figures

METHOD AND APPARATUS FOR OBTAINING A NOZZLE VELOCITY PROFILE OF A TENTER OVEN

BACKGROUND AND SUMMARY OF THE INVENTION

In order to properly treat fabric webs, it is often necessary to precisely control air flows in textile treating assemblies. For instance in order to dry and cure finishes of, and to affix dyes to, fabrics, the air flow in tenter ovens must be precisely controlled. Hot air is introduced into the tenter oven through nozzles, usually arranged in an upper plurality of nozzles above the fabric, and a lower plurality of nozzles below the fabric. The heat applied to the fabric is a function of the air velocity through the nozzles, and by controlling the nozzle velocity one can assure equal (or perhaps deliberately unequal and compartmentalized) heat distribution in the oven and uniform treatment across the width of the fabric, as well as uniform treatment of the top and bottom of the fabric.

Conventionally, air distribution control in tenter ovens is determined by a slow and cumbersome process. Each nozzle throughout the oven is individually checked and the data recorded by hand. Should any change be made in the flows within the oven (such as actuation of a damper) each nozzle must again be checked by hand.

According to the present invention a method and apparatus are provided which secure the quick and effective determination of nozzle velocity profiles of a textile treating assembly, and particularly nozzle velocities associated with the nozzles in a tenter oven. Practicing the invention it is possible without arresting the fabric web movement through the tenter oven to progressively and automatically sense the nozzle velocity, and to automatically transmit that information to appropriate instrumentation located exteriorly of the tenter oven so that the information can be readily utilized to properly adjust nozzle velocities (if necessary) to achieve the desired flow characteristics.

Exemplary apparatus according to the invention comprises a web engaging component of a velocity profiling system. The component includes an elongated support having first and second ends with at least one web-engaging pin mounted on the support first end for engaging a portion of the web so that the support moves with the web. An air velocity probe means, such as a pitot tube, is mounted to the support between the first and second ends thereof, and a transducer is operatively connected to the pitot tube for producing electrical signals responsive to the conditions sensed thereby. Electrical connection means extend between the support second end and remote components of the velocity profiling system located exteriorly of the tenter oven. The electrical connection means comprises a wire which is connected to a reeling assembly exterior of the oven, the reeling assembly being substantially that shown and described in U.S. Pat. No. 4,360,277 (the disclosure of which is hereby incorporated by reference herein).

In the method of obtaining the nozzle velocity profile according to the invention, without arresting the fabric web movement the velocity probe—with wire attached—is placed in operative engagement with a specific point of the fabric web as the web moves through the textile treating assembly. The wire is unreeled as the probe moves through the assembly. The velocity is continuously monitored at specific points within the assembly as the fabric moves through the assembly, by monitoring the velocity data supplied by the probe. The probe typically is a pitot tube, and the pressure values sensed thereby are converted to electrical signals and transmitted to the exterior of the textile treating assembly, the velocity being readily calculable from the pressure values sensed. Then without arresting the fabric web movement the probe is disconnected from the web when it exits the textile treating assembly, and the wire is reeled up.

It is the primary object of the present invention to provide a method and apparatus for simply and easily determining nozzle velocities in a textile treating assembly. This and other objects of the invention will become clear from an inspection of the detailed description of the invention, and from the appended claims.

DETAILED DESCRIPTION OF THE DRAWINGS

Figure 1:
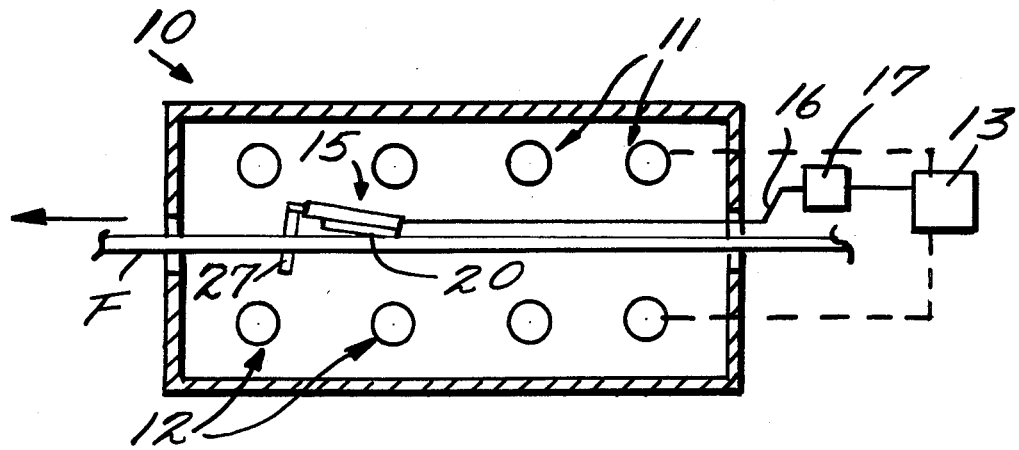
FIG. 1 is a side schematic view illustrating exemplary apparatus for practicing a method according to the present invention.

The invention is utilizable to determine the nozzle velocity profile of a textile treating assembly, particularly a tenter oven, shown schematically in FIG. 1 and referenced by numeral 10. The tenter over 10 includes a plurality of nozzles including an upper plurality of nozzles shown generally by reference numeral 11, and a lower plurality shown generally by reference numeral 12. The nozzles 11, 12 are typically adjustable to vary the velocity of the heated air flowing therethrough, and a conventional remote control device 13 may be provided for that purpose.

A system for velocity profiling according to the present invention includes a web engaging component shown generally by reference numeral 15 connected by a wire 16 (typically but not necessarily a 4-wire cable) to a reeling device 17, which in turn is operatively connected to the control 13, to a monitoring device such as a dual channel strip chart recorder, or the like. The reeling device 17, wire 16, and a typical recorder are substantially shown in U.S. Pat. No. 4,360,277, the disclosure of which is incorporated by reference herein. Reeling device 17 varies from the referenced device only insofar as it may provide additional slip-ring or the like means for handling more than one electrical circuit.

Figure 2:
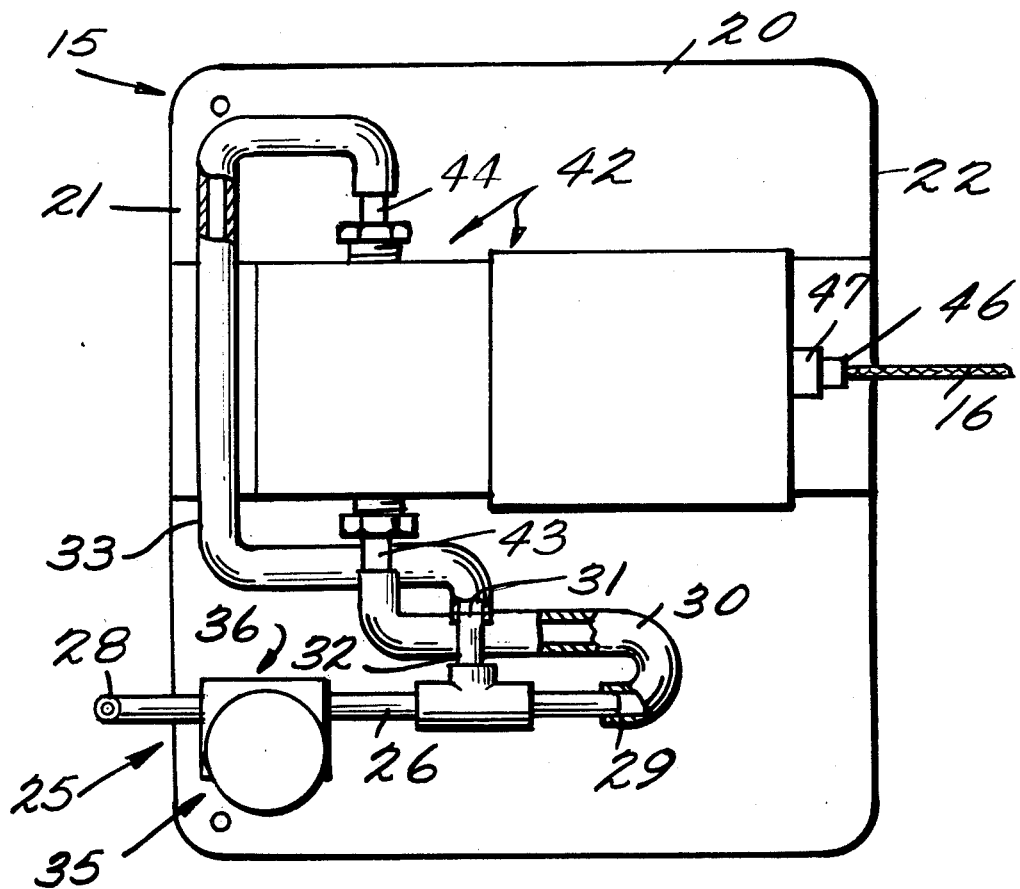
FIG. 2 is a top plan view of an exemplary web-engaging component of a velocity profiling system according to the present invention.
Figure 3:
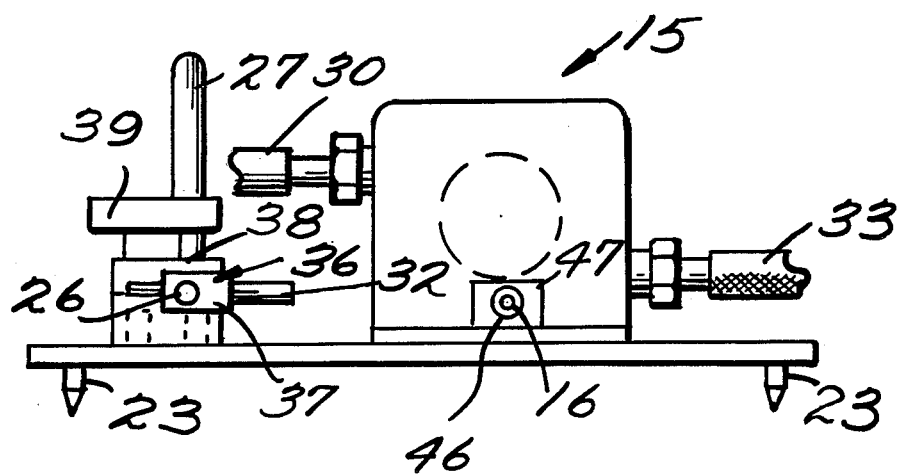
FIG. 3 is a rear end view of the web engaging component of FIG. 2.
Figure 4:
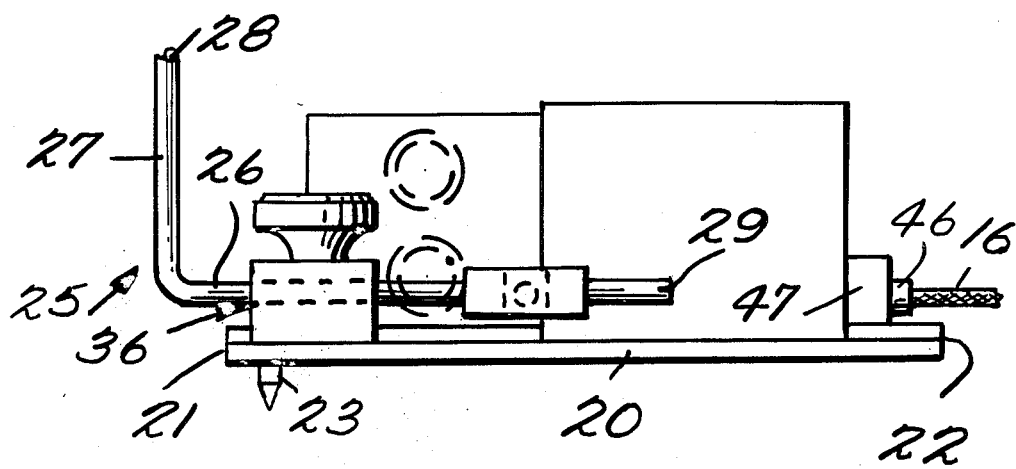
FIG. 4 is a side view of the web engaging component of FIG. 2.

The component 15 is more clearly illustrated in FIGS. 2 through 4. It includes an elongated support 20 having a first, leading end 21, and a second, trailing end 22. At least one web engaging pin 23, and preferably a pair of spaced pins 23, is provided on the support 20 adjacent the first end 21 thereof to extend from the bottom of the support 20 for engaging a portion of a fabric web F. The pins 23 engage the web and cause the support 20 to move with the portion of the fabric web F engaged, in a manner substantially the same as shown in said U.S. Pat. No. 4,360,277.

The component 15 further comprises air velocity probe means, shown generally by reference numeral 25. The air velocity probe means may be a means for directly determining air velocity associated with the nozzles 11, 12, or for sensing pressure associated with the nozzles, which pressure determinations can be used to calculate velocity. Preferably the probe means 25 comprises a pitot tube including a base portion 26 and a sensing portion 27. The free tip 28 of the sensing portion 27 is disposed so that it extends outwardly from the support 20 to an appropriate position for sensing both the total and static pressure associated with each nozzle 11, 12. A pair of output openings are provided from the base portion 26, a first output opening 29 being in-line with the base portion 26 and being adapted to be connected to a flexible tube 30. An opening 31 extends from a rigid tube portion 32 which is substantially perpendicular to the base portion 26, and in fluid communication therewith, and is adapted to be connected to the flexible tube 33.

Means are provided for mounting the probe means 25 on the support 20 so that the sensing portion 27 extends outwardly from the support 20 into operative position. The mounting means is shown generally by reference numeral 35 and includes a clamping means 36 mounted to the top of the support 20 adjacent one of the pins 23, the clamping means 36 including a bottom portion 37 (see FIG. 3) and a top portion 38, the top portion being reciprocated up and down with respect to the bottom portion 37 by the adjustment of screw knob 39 to releasably clamp the base portion 26 of the pitot tube in position. When the screw knob 39 is rotated so that no clamping force is exerted by the clamping portions 37, 38, the pitot tube sensing portion 27 may be moved from the position illustrated in FIGS. 2 through 4—wherein it extends upwardly from the support 20—to the position illustrated in FIG. 1—wherein it extends downwardly from the support 20 and through the fabric web F. This adjustment in position allows the probe means 25 to be operatively associated with either the upper plurality of nozzles 11, or the lower plurality of nozzles 12, respectively, as it passes through the tenter oven 10 with the fabric web F.

The component 15 further comprises transducer means, shown generally by reference numeral 42, operatively connected to the probe means 25 for producing electrical signals responsive to sensing by the probe means 25. The transducer means 42 preferably comprises a conventional pressure transducer, and it is mounted to the support 20 adjacent the probe means 25. The transducer means 42 generates an output signal proportional to the difference between the total and static pressures sensed by the pitot tube. The total pressure sensed by the pitot tube is transmitted through tube 30 to the transducer means 42, the tube 30 being connected up to conventional nipple 43, and the static pressure is transmitted through tube 33 and conventional nipple 44 to the transducer means 42.

The component 15 further comprises electrical connection means at the second end 22 of the support adapted to electrically interconnect the transducer means 42 to other, remote, components of the velocity profiling system, such as the reeling means 17, a chart recorder, and the like. The electrical connection means comprises a conventional releasable wire end, such as a conventional plug 46 which is received within a socket 47 at the rear of the transducer means 42. The probe means and the transducer means comprise means for producing an output signal which is linear to air flow.

Utilizing the pressure information transmitted through wire 16 to the components of the velocity profiling system located exteriorly of the tenter oven 10, one can either manually or automatically (e.g. with a computer) calculate the velocity associated with each nozzle 11, 12. For fluid flow, this calculation would be according to the formula:

$$P_2/\rho = P_1/\rho + V_1^2/2$$

wherein $P_2$ is the total pressure, $P_1$ the static pressure, $\rho$ the known fluid density, and $v_1$ the velocity. This data is used to control, if necessary, the positioning of, and flow through, the nozzles 11, 12 to obtain optimum flow conditions for uniform heat treatment of the fabric F, etc.

METHOD

Utilizing the component 15, etc., a method of obtaining a nozzle velocity profile of a tenter oven, or like textile treating assembly 10, is accomplished as follows:

Without arresting the movement of the fabric web F, the velocity probe means—25—, with wire 16 attached, is placed in operative engagement with a specific point of the web F as the web F moves through the tenter oven 10. Pins 23 engage the fabric web F and hold the component 15 in place.

Unreeling of the wire 16 from the assembly 17 is effected as the probe 25 moves with the fabric web F through the tenter oven 10. In one pass of the component 15 the pitot tube is oriented so that the sensing portion 27 thereof extends vertically upwardly into operative cooperation with the upper plurality of nozzles 11.

By monitoring the data supplied by the probe means 25, through transducer means 42, one continuously monitors the velocity at specific points within the oven 10. The velocity data is readily calculated from pressure values determined by a pitot tube acting as the probe means 25.

As the component 15 exits the tenter oven 10, without arresting the fabric movement the probe means 25 is removed from the web F. This is accomplished merely by lifting the support 20 off the web F (and a handle, not shown, may be provided for that purpose) and then disconnecting the plug 46 from the socket 47. Then the wire 16 is reeled up utilizing the reeling device 17.

After passage of the component 15 through the oven 10 with the sensing portion 27 of the pitot tube upright, the clamping means 36 is released and the sensing portion 27 is rotated so that is passes through the fabric F and downwardly into cooperating relationship with the lower plurality of nozzles 12. Then the above steps are repeated as the fabric web F passes through the tenter oven 10 with the component 15 oriented as illustrated in FIG. 1.

The data supplied by the probe means 25 may be used to control, if necessary, the positioning of, and flow through, the nozzles 11, 12 to obtain optimum flow conditions. This data may be used to automatically control the nozzles 11, 12 through the control means 13, or to supply an operator with information with which to control the nozzles 11, 12.

It will thus be seen that according to the present invention a method and apparatus have been provided for the effective determination of a nozzle velocity profile for a textile treating apparatus. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and structures.

What is claimed is:

1. A method of obtaining a nozzle velocity profile of a textile treating assembly having a fabric web moving therethrough, and having a plurality of nozzles providing air flow therein, and utilizing a velocity sensing probe interconnected by a reeled wire to a monitor, comprising the steps of:
    (a) without arresting the movement of the fabric web through the textile treating assembly, placing the velocity probe—with wire attached—in operative engagement with a specific point of the fabric web as the web moves through the textile treating assembly;
    (b) effecting unreeling of the wire as the probe moves with the fabric web through the textile treating assembly;
    (c) continuously monitoring the air velocity from the nozzles at specific points within the textile treating assembly as the fabric web moves through the textile treating assembly by monitoring the velocity data supplied by the probe;
    (d) without arresting the fabric web movement, removing the probe from the web after it exits the textile-treating assembly; and
    (e) reeling up the wire.

2. A method as recited in claim 1 comprising the further step of, between steps (d) and (e), disconnecting the wire from the probe.

3. A method as recited in claim 1 wherein the textile treating assembly comprises a tenter oven and wherein the plurality of nozzles includes an upper plurality of nozzles above the fabric web, and a lower plurality of nozzles below the fabric web, and wherein the velocity probe has a sensing portion; and wherein steps (a) through (e) are practiced with the sensing portion of the velocity probe disposed above the fabric web, and then steps (a) through (e) are repeated with the sensing portion of the velocity probe below the fabric web.

4. A method as recited in claim 3 wherein step (c) is practiced by continuously recording the velocity data supplied from the probe, and using the data to control the positioning of, and flow through, the nozzles of the textile assembly to obtain optimum flow conditions.

5. A method as recited in claim 2 wherein the probe is mounted on a probe supporting structure having fabric engaging and pentrating pins, and wherein step (a) is practiced by merely laying the probe supporting structure on the moving web so that the fabric pins will penetrate and engage the web while the probe is held in operative position.

6. A method as recited in claim 1 wherein step (c) is practiced by continuously recording the velocity data supplied from the probe, and using the data to control the positioning of, and flow through, the nozzles of the textile treating assembly to obtain optimum flow conditions.

7. A web engaging component of a velocity profiling system, comprising:

an elongatged support having first and second ends;
at least one web-engaging pin mounted on said support adjacent said first end to extend from the bottom of the support for engaging a portion of a web and causing the support to move with the web portion engaged;
air velocity probe means for sensing the air velocity in its surrounding environment;
means for mounting said probe means to said support so that said probe means extends outwardly from said support into operative position;
transducer means mounted on said support and operatively connected to said velocity probe means for producing electrical signals responsive to velocity sensing by said velocity probe means; and
electrical connection means at said support second end and adapted to electrically interconnect said transducer means to other remote components of a velocity profiling system.

8. A component as recited in claim 7 wherein said velocity probe means comprises a pitot tube.

9. A component as recited in claim 8 wherein said pitot tube comprises means for sensing total and static pressure, and wherein said transducer means comprises means for generating an output electrical signal proportional to the difference between the total and static pressures transmitted thereto by said pitot tube.

10. A component as recited in claim 9 wherein said pitot tube includes an open end; and wherein said means for mounting said probe means to said support comprises means for mounting said pitot tube so that said open end thereof is movable between a first, stationary, operable position above the support and web, to a second, stationary, operable position below the support and web.

11. A component as recited in claim 10 wherein said means for mounting said pitot tube comprises a clamping means for clamping a portion of said pitot tube remote from said open end thereof, and holding said pitot tube in a desired position when clamped; and adjustable screw means for loosening and tightening said clamping means.

12. A component as recited in claim 9 wherein said pitot tube includes an elongated base portion, said base portion including first and second output openings; and flexible tubing means for interconnecting said first and second output openings of said pitot tube base to said transducer means.

13. A component as recited in claim 12 wherein said pitot tube includes a sensing portion operatively connected to said base portion at generally a right angle, and wherein said sensing portion overhangs said support first end.

14. A component as recited in claim 8 wherein said pitot tube has a sensing portion, and wherein said means for mounting said probe means comprises means for mounting said pitot tube so that said sensing portion thereof overhangs said support first end.

15. A component as recited in claim 7 wherein said probe means and said transducer means comprise means for producing an output signal which is linear to air flow.

16. A method of obtaining a nozzle velocity profile of a textile treating assembly having a plurality of nozzles providing air flow therein utilizing a pitot tube for sensing total and static pressure associated with each nozzle, comprising the steps of:

(a) progressively passing the pitot tube past each nozzle in the interior of the textile treating assembly;

(b) converting the difference between the total and static pressures sensed by the pitot tube at each of the nozzles to an electrical output signal proportional to the differences in pressure;

(c) transmitting the electrical output signal to the exterior of the textile treating assembly;

(d) utilizing the electrical output signals transmitted in step (c) to determine the nozzle velocity of each nozzle; and (e) using the nozzle velocity data, controlling, if necessary, the positioning of, and flow through, the nozzles of the textile treating assembly to obtain optimum flow conditions.

17. A method as recited in claim 16 wherein step (a) is practiced by passing the pitot tube through the textile treating assembly in operative association with a fabric web passing through the textile treating assembly.

18. A method as recited in claim 17 wherein steps (a) through (e) are practiced without interrupting the movement of the fabric web.

19. A method as recited in claim 17 wherein the textile treating assembly plurality of nozzles comprises an upper plurality of nozzles above the fabric web, and a lower plurality of nozzles below the fabric web, and wherein the pitot tube has a sensing portion; and wherein steps (a) through (e) are practiced with the sensing portion of the pitot tube above the fabric web, and then steps (a) through (e) are repeated with the sensing portion of the pitot tube below the fabric web.

20. A method as recited in claim 16 wherein step (c) is practiced utilizing a reeled, detachable wire operatively connected from the pitot tube to a reeling device exterior of the textile treating assembly.

* * * * *